3,297,801
MANUFACTURE OF INSULATING FIREBRICK
Howard Edwin Konrad, Somerville, N.J., assignor to Johns-Manville Corporation, New York, N.Y., a corporation of New York
No Drawing. Filed Jan. 21, 1965, Ser. No. 427,096
5 Claims. (Cl. 264—44)

This application is a continuation-in-part of copending application Serial No. 180,349, filed March 16, 1962, now abandoned.

This invention relates to the manufacture of insulating firebrick, and more particularly to an improved procedure and techniques for the forming, drying and firing, of low iron content, lightweight insulating firebrick.

Current methods and procedures, such as exemplified by U.S. Letters Patent No. 2,242,434, for the manufacture of porous, low density insulating firebrick or products entail certain restricting firing prerequisites including, for example, distinct multiple kiln temperatures and atmospheric requirements, as well as restricting spacing limitations for the individual bricks or the like sized articles to achieve the controlled and equalized kiln conditions producing regulated, relatively uniform and complete burnout of combustible materials with dissipation of steam and volatiles, and equalized and complete heat penetration and firing. Further, in addition to such more or less obvious drawbacks as uneconomical handling and excessive waste in trimming, the prior art practices for the manufacture of low density insulating firebrick require cementing together of two or more individual bricks or shapes to provide outsized items.

It is the principal object of this invention to provide an improved procedure or techniques for the manufacture of porous, low density insulating firebrick comprising forming and firing relatively large shaped slabs or bodies, conveniently and economically sized to multiples of the dimensions of conventional or other desired brick or articles, whereby more stable and effectual spacing in kiln stacking or loading enables the use of uninterrupted and uniformly but rapidly progressing gradated or increased kiln temperatures expeditiously effecting continuous and equalized fast heat penetration and firing conditions with accompanying burnout and dissipation of steam and other volatiles and firing of the refractory constituents without excessive shrinkage, warpage or distortion, cracking or other disfigurement, or causes of rejection.

It is also a primary object of this invention to provide unique and improved rapid kiln firing techniques or conditions for the manufacture of porous, low density insulating firebrick and articles comprising maintaining an equalized kiln temperature gradient consisting of initial high temperatures which prorgessively and relatively uniformly advance to ultimate firing conditions without appreciable regressions or fluctuations notwithstanding the extensive absorption of heat or endothermic effect of the substantially instantaneous flashing of water from the newly introduced ware to steam, and/or the evolution of heat or exothermic effect produced by the combustion of the sawdust.

A further object of this invention is to provide an improved process of manufacturing insulating firebrick or the like products which permits significantly greater latitude or leeway in the spacing or stacking of ware and in the capacity of the kiln car load which in turn enables greater air or heat flow or velocity and volume, and control thereof, effecting more uniform heating and temperature penetration whereby faster firing and/or tunnel kilns of larger cross-sections and commensurately larger kiln cars and loads are obtainable, or in other words higher production rates can be achieved.

A still further object of this invention is to provide an improved and expeditious process of manufacturing insulating firebrick providing for the rapid kiln drying and firing of wet sawdust and gypsum containing ware without regard to its water and combustible content, or rate of volatilization and elimination thereof at any temperature, location or other condition of the kiln or stage of the drying and firing process conducted therein, and which does not require any control or manipulation of the kiln atmosphere including maintenance of dual or varied atmosphere conditions, or any correlation thereof with the temperatures or state of the drying or firing.

It is also a further object of this invention to provide an improved and rapid process of kiln drying and firing insulating firebrick which reduces shrinkage and warpage in the fired bodies.

Also, ancillary but economically significant objects of this invention comprise marked reductions in: (a) handling, such as involved in loading and unloading a kiln or kiln cars; (b) equipment, such as the number of molds, distinct drying and firing kilns or means; and (c) the amount of trim waste or scrap resulting from cutting to precise dimensions; and, among other objects, the instant method produces fired shapes of ample size for the subsequent cutting of many special shapes or items without cementing components together which in turn permits the maintenance of reduced inventories.

These and other objects and advantages of the invention will be apparent from the detailed description given hereinafter, and it should be understood that the detailed description, while indicating preferred embodiments of this invention, is given by way of illustration only as variations and modifications within the spirit and scope of the invention will become apparent from the following detailed description.

A simplified flow diagram illustrating the process and sequence of operations is as follows:

(a)                  Raw Materials (b)                      Mixer (c)                   Cast Molds Wet Slabs (d)                       Kiln Entrance temperature at least 1000° F. and temperature increasing at a constant gradient up to approximately 2350 to 2500° F. over a period of at least 2 hours.

(e) Cutting and trimming the fired slabs to brick, etc.

This invention is based upon the finding that porous, lightweight insulating firebrick or shapes of high quality can be produced, including kiln drying and firing, in the form of relatively large slabs or bodies sized approximately to multiples of the dimensions of standard brick or the like items, for example about 25 in. x 10 in. x 3 in. or ample for subdivision into 5 standard dimensioned bricks, more effectively and economically than individual bricks or articles of substantially smaller dimensions, coupled with the further finding of an expeditious process or techniques, in particular rapid kiln drying and firing conditions, which enable and facilitate this more efficient and improved means. In brief, this invention is practiced by performing the steps of: (a) preparing a batch of a dry blend containing apt proportions and constituents in accordance with an appropriate insulating brick formulation, viz., clay, gypsum plaster and sawdust, either with or without grog; (b) admixing the dry blend with water to form a castable plastic material or mass and to incite hydration of the gypsum; (c) casting the wetted plastic material or mass into suitably shaped slabs or blocks, preferably sized to a multiple(s) of the dimensions of the desired ultimate brick or article, and promptly upon substantial hydration or setting of the gypsum plaster to the point of providing self-supporting integrity and adequate handleability; (d) drying and firing the still wet shaped slabs by subjecting the same to uninterrupted and/or continuously uniformly progressing gradated or increased ambient temperature conditions which attain or culminate at firing temperatures, said drying and firing comprising directly exposing the shaped slabs while wet to initial ambient temperature conditions of at least about 1000° F. and preferably about 1400° to 1500° F., which rapidly advance uniformly at a substantially continuous rate to ambient temperatures of approximately about 2350° F. to 2500° F., over a period of about 2 to 12 hours, preferably about 6 hours, with the period of firing and drying varying proportionately with the rate of temperature increase, and maintain the same for a dwell period sufficient to attain substantially uniform firing temperatures and in turn firing throughout the mass of the slabs, typically a period of about 2 to 6 hours and normally about 3.5 hours; and (e) cutting and trimming the fired slabs into refractory products such as bricks of desired or appropriate dimensions and/or shapes.

Although in most operations it is more suitable and advantageous to blend in the clay dry, it is possible and may be appropriate depending for example upon process or equipment limitations, to add all or a part of the clay as clay slip, that is an admixture or slurry of water and clay.

The batch of constituents or furnish, as indicated hereinbefore, comprises more or less typical or conventional formulations for the manufacture of low density insulating brick and the like articles by prior techniques. For example, suitable and preferred formulations for the practice of this invention include, in approximate percentages by weight:

| Ingredients | Range | Preferred |
| --- | --- | --- |
| Clay | 45–65 | 55 |
| Gypsum | 15–30 | 23 |
| Sawdust | 5–30 | 12 |
| Grog | 0–25 | 10 |

The clay includes pulverized fire clays or the like refractory clays having relatively high fusion points and preferably consists of a kaolinite type clay. The clay material should, of course, be of relatively high purity, i.e., low in iron oxides, titania, etc. content to provide adequate temperature resistance and enable the use of the products under varied service conditions such as controlled atmosphere applications. Kaolin clays found in Georgia, South Carolina, Florida and Alabama are preferred as they impart optimum properties to the products.

The gypsum plaster comprises an appropriately dehydrated calcium sulfate of relatively high purity, i.e., preferably of low carbonate and magnesium content, with an optimum controlled setting time of about 6 to 8 minutes providing for mold formation and extraction therefrom in a period of approximately 20 minutes.

Sawdust may comprise substantially any of the commonly available soft or hard woods, preferably sized about minus 8 mesh or within an approximate range of minus 3 to minus 20 mesh or finer for optimum porosity and with a kiln dried bulk density of about 120 to 400 grams per 1000 cc. Optimum properties comprise a bulk density of 180 to 220 grams per 1000 cc., with a moisture content of less than 10%.

Grog typically comprises, but is not limited to, production trim and rejects of like products which have been suitably crushed or sized approximately as follows:

| Screen Size | Percent Retained On— | |
| --- | --- | --- |
| | Range | Average |
| 6 mesh | 0.4–1.8 | 0.7 |
| 10 mesh | 2.6–5.8 | 3.9 |
| 20 mesh | 5.2–10.0 | 7.8 |
| 100 mesh | 13.6–30.6 | 23.2 |

Dry blend batches composed of the foregoing ingredients are admixed with water to produce a castable plastic, and preferably flowable mass or material and to incite or induce hydration of the gypsum plaster. Water is normally employed in approximately equal parts by weight with the solids (that is about 100% by weight of the solids) but may be utilized in amounts ranging from approximately 70 to 125% by weight of the solids to provide fluidity or plasticity for good molding, and the amount of water may be regulated to facilitate control of the strength and density of the final product. Appreciable excesses in the amount of water should be avoided, however, as they may tend to promote cracking in the fired material as well as reduce the molded strength of the unfired slabs. Also, the mixing of the dry components with or into the water should be kept to a minimum to prevent the sawdust from taking up excessive quantities of water and premature setting of the gypsum plaster, and terminated upon achieving a substantially homogeneous blend which, depending upon the batch size and equipment, may range in the vicinity of about 5 to 90 seconds and typically approximately 25 seconds. Further, the timing of the addition of water should be coordinated with the subsequent steps of molding or shaping and introduction into the firing or kiln means on the basis of the setting time of the gypsum plaster which in turn can be selected within certain limits to accommodate the process.

Casting or shaping of the wetted plastic mass or material appropriately timed or coordinated with the addition of water, may be effected by any substantially convenient or practical common means or method including molding. The cast slabs or bodies are shaped and/or sized to any apt or convenient configuration and/or dimensions for subsequent division or cutting into two or more bricks, or into relatively larger specially shaped articles. For example, the slabs may be cast to a size comprising a multiple of standard brick dimensions such as slabs of about 25 in. x 10 in. x 3 in. comprising a body of sufficient size for cutting and trimming into 5 bricks of standard dimensions.

Upon shaping or forming of appropriately dimensioned slabs or bodies and sufficient hydration or setting of the gypsum plaster to impart shape retaining structural and handling characteristics to the bodies, the mold(s) or shape constraining means, if utilized, is removed and the still wet material is ready for immediate firing. Moreover, when the foregoing specifications have been followed as in the preferred practice of this invention, the shaped or molded slabs or bodies in dimensions of say about 25 in. x 10 in. x 3 in., or even greater, exhibit sufficient integrity or structure after approximately a 20 minute mold period to permit individual spaced standing on a vertical edge or face (e.g., one edge dimensioned 3 in. x 25 in.) and spaced stacking upon each other to a height of three or more tieres or courses such as is customary in loading a kiln or kiln car.

To be effective and without adverse consequences, firing of such relatively large wet slabs or bodies must comprise subjecting or exposing the said slabs or bodies, while still wet or damp, directly to relatively high initial ambient temperature conditions and continuing the exposure thereof to uninterrupted and uniformly progressing increased ambient temperature conditions or gradient over an extended period until firing is effectuated. Appropriate temperatures and time conditions for firing include gradients comprising a minimum initial temperature of at least approximately 1000° F., increasing up to firing conditions of approximately 2350° F. ranging to approximately 2500° F. over periods of at least about 2 hours up to approximately 12 hours, and maintenance at the attained firing temperatures of approximately 2350° to 2500° F. for dwell periods of about 2 to 6 hours. Although longer kiln heating and dwell periods are not detrimental they are not normally necessary and in turn are not economically feasible. Preferred temperatures and times thereof for a typical product consist of a temperature gradient beginning with an initial ambient temperature of approximately 1400° F. steadily and rapidly increasing or advancing to approximately 2400° F. over a period of about 6 hours or less with a dwell period of about 3.5 hours at firing temperatures of approximately 2400° F. Regardless of the particular temperature-time condition involved, it is imperative that the ambient temperatures are substantially equalized at any point transverse the tunnel of the kiln and rise gradually and substantially continuously to firing conditions without appreciable fluctuations or regressions which degrade and/or destroy the product.

Although other systems or techniques may be known or are advisable such as a controlled temperature increase in a periodic kiln, the necessary drying and firing step(s) for carrying out this invention with assured effectiveness and facility is accomplished with a continuous or tunnel kiln, equipped with kiln cars and track, provided with recirculating means and make-up or auxiliary heaters. Effective temperature equalization and ambient conditions within any area transverse or at right angles to the kiln tunnel or course is produced by redistributing the heat from the normally hotter kiln top or crown and sides over or through the ware or cast articles with recirculating means drawing hot gases from the crown of the kiln and returning them at high velocities through passages and openings located in the kiln side walls into and among the spaced and stacked ware or kiln load. The make-up or auxiliary heating means employed in conjunction with the recirculating system provide and maintain a uniform and relatively steady temperature gradient and transfer of heat extending from the area of the primary or main heat course in the firing zone toward the discharge end of the kiln through the kiln to the charging end, effectively modulating and overcoming thermal perturbations resulting from absorption and/or evolution of heat due to volatilization and/or combustion of components within the ware or cast articles, i.e., the rapid endothermic effects of evaporating or flashing the initial water content into steam and the appreciable exothermic effects of the combustion of the sawdust or other combustibles. In addition to the foregoing means of regulating and equalizing the over-all temperature conditions or gradient within the kiln or tunnel, a heat trapping air lock or vestibule at the charging end of the kiln is a particularly effective and in turn desirable aid in maintaining entrance initial temperatures of at least 1000° F., and such a trap is also highly desirable for reasons of economy at the discharge end.

The tunnel kiln, as is customary, comprises the use of kiln cars or the like appropriate conveying means for transporting or conveying the ware through the kiln at a suitable rate. The kiln cars may be conventionally motivated either intermittently or substantially continuous by a car pusher or moved continually with a drive means such as a chain with dogs.

Although for the practice of this invention the temperature conditions within the kiln comprise a suitably uniform or substantially continuous gradient extending from the charging end to the primary firing means or main heat source, the kiln tunnel may also be contemplated for purposes of illustration as being divided into three areas or sections wherein certain functions are effected, viz., drying and burnout, pre-firing and firing. Approximate temperature conditions or gradients and exposure or dwell times thereof for the kiln tunnel found to be suitable are illustrated in the following table. The given zones are not to be taken as representing or delimiting distinct areas within the tunnel but merely comprise a convenient means of subdivision for the purposes of demonstrating or giving typical temperature conditions at points along the gradient or intermediate the tunnel extremities with appropriate dwell periods and, in turn, rates of travel or conveyance of the ware through the tunnel.

TABLE

| Kiln Tunnel Position | Temperature Range, ° F. | Preferred Temperature, ° F. | Time in Minutes |
| --- | --- | --- | --- |
| Changing End Entrance: | | | |
| Zone 1 | 1,000–1,500 | 1,400 | 45–90 |
| Zone 2 | 1,100–1,600 | 1,500 | 45–90 |
| Zone 3 | 1,200–1,700 | 1,550 | 45–90 |
| Zone 4 | 1,300–1,880 | 1,600 | 45–90 |
| Preheating: | | | |
| Zone 5 | 1,500–2,100 | 1,810 | 30–60 |
| Zone 6 | 1,600–2,200 | 1,970 | 30–60 |
| Firing: | | | |
| Zone 7 | 2,250–2,450 | 2,360 | 30–60 |
| Zone 8 | 2,350–2,500 | 2,410 | 30–60 |
| Zone 9 | 2,350–2,500 | 2,410 | 30–60 |

A particularly significant aspect and advantage of this invention is the finding that the chemical nature or make-up of the kiln atmosphere, viz., whether oxidizing, reducing or neutral, does not discernibly influence the drying and firing procedure or otherwise affect the products thereof whereby the process does not require or involve any controlled regulation or manipulation of the kiln atmosphere other than as to its temperature and circulation. Nevertheless, because the most expeditious means apparent for maintaining a substantially uniform or continuous ambient temperature gradient condition along the tunnel of a conventional tunnel kiln comprises, in addition to ancillary heating means, extensive kiln atmosphere recirculating means entailing the introduction and movement of large volumes of air or the atmosphere thereof to overcome pockets or stagnant areas and channels of temperature variations within the tunnel such as in the kiln crown, the tunnel kiln atmosphere in practice is oxidizing or comprises a surplus of oxygen, and typically an appreciable excess of oxygen, throughout its length. Moreover, in that a neutral atmosphere or even a reducing atmosphere, or in other words an atmosphere containing a minimum quantity of oxygen or an insufficient amount for the uninhibited oxidation or burnout of the combustibles such as sawdust, would tend to retard the necessary combustion phase of the process, a decided time advantage in the kiln operations is achieved by providing ample oxygen to effect the most rapid and accelerated completion of the combustion phase. In other words, considering all factors an oxidizing atmosphere substantially throughout the kiln tunnel or during the phase of the drying and firing procedure is desired and maintained primarily as a matter of expediency.

After firing the slabs or ware are cut and/or trimmed to desired configurations and/or dimensions. For example, fired slabs measuring about 25 in. x 10 in. x 3 in. may be slit and trimmed to 5 standard bricks 4½ in. x 9 in. in thicknesses of either 2½ in. or 3 in. Moreover, as is apparent, relatively large bodies produced by the foregoing procedure may be cut into many special outsized shapes or articles without bonding individual units into a component block as is frequently necessary in the production of bricks of standard dimensions.

To be effectual and fully capitalized upon the advantages of stacking or spacing and more uniform and efficient heat distribution and circulation with accompanying improved burnout and firing with the relatively large slabs or bodies, as opposed to individual bricks or units, without incurring possible adverse effects such as excessive shrinkage, warpage, or cracking, certain precautionary measures or controls should be observed in this practice of the invention. First, excessive proportions of water in the admixture, for example quantities substantially greater tran about 125% by weight of the solids may produce a tendency of cracking during firing as well as reducing the molded strength of the unfired shape. On the other hand, apt proportions of water, e.g., about equal by weight of the solids, impart ample fluidity to the admixture for good handling and molding, and the regulation of the water-to-solids ratio is influential in controlling strength and density of the fired products. Also, the shaped slabs or cast ware should be directly introduced or subjected to an initial atmosphere of ambient temperatures of at least about 1000° F. while still wet or in a yet damp condition as rapidly as possible upon formation or shaping whereupon the water content thereof is converted or flash almost immediately into steam with an extensive absorption of thermal energy. To effectuate a prompt formation or casting and firing, the setting time of the gypsum plaster should be predetermined and an optimum setting time enabling effective handling is from about 6 to 8 minutes permitting molding formation and extraction from the mold within a period of about 20 minutes. Further, as indicated hereinbefore, the temperature gradient within the kiln must be maintained in an equalized and substantially uniformly progressing increase as appreciable drops or fluctuations therein at any point result in cracking of the slabs. Temperature equalization and an even gradient throughout the kiln tunnel are achieved by apt adjustments or settings of the auxiliary make-up heaters and the volumes and velocities of hot gases recycled by the circulating means.

It is noteworthy that in this procedure with the presence of the extensive amounts of water vapor produced, no tar or smoke is formed. Without restricting this invention to any theory or mechanism, it appears evident that some type of water-gas reaction(s) may take place in the presence of the great volumes of steam which are evaporated.

The following example of a specific embodiment demonstrates one preferred and established procedure for carrying out this invention. It is to be understood that this example is given for purposes of illustration rather than limitation and that the specific constitutents or products produced therefrom, techniques or procedures, and conditions set forth are merely exemplary and are not to be construed as limiting the invention to any particular means or conditions.

*Example*

In this example lightweight insulating firebrick were produced pursuant to the procedure and techniques of this invention with the following illustrative and preferred low iron content, lightweight insulating brick formulation or furnish consisting, in percentages based upon weight, of:

|  | Percent | Pounds |
| --- | --- | --- |
| Kaolinite Clay | 55 | 467 |
| Gypsum Plaster | 23 | 195 |
| Sawdust | 12 | 102 |
| Grog | 10 | 86 |
| Total |  | 850 |

The gypsum plaster had a controlled setting time of about 6 to 8 minutes, the sawdust a bulk density of 180 to 220 gms./1000 cc., and the grog or crushed trim and reject material from previous runs of light brick was sized as follows:

| Screen size: | Average percent retained |
| --- | --- |
| 6 mesh | 0.7 |
| 10 mesh | 3.9 |
| 20 mesh | 7.8 |
| 100 mesh | 23.2 |

A dry blend of the foregoing furnish batch was prepared by mixing the materials to substantial uniformity and adding the same to approximately an equal part of by weight, i.e., 850 lbs. of water to produce a castable, flowable admixture and to actuate or incite hydration in the gypsum plaster. Upon admixing with the water for a period of about 25 seconds whereupon a flowable, homogeneous mass suitable for casting was obtained, the admixture was poured into large gang molds forming individual slabs approximately 25 in. x 10 in. x 3 in. Approximately 20 minutes after casting the shaped and now structurally self-supporting and handleable slabs were removed from the molds and stacked on their edge or face measuring 3 in. x 25 ft. in. in two parallel rows, spaced about 2 in. to 3 in. apart on the bed of a kiln car and three courses or tiers in height with each course or tier placed perpendicular to the adjacent course(s). The particular kiln cars utilized held 24–30 slabs per course in two adjacent columns or rows.

The thus loaded kiln car containing the still wet slabs was directly transferred through a heat trapping vestibule or air lock into a charging end of a tunnel kiln whereupon the kiln ware was immediately subjected to an initial ambient temperature of approximately 1400° F. This car was then essentially continuously transported through the kiln tunnel by means of a hydraulic car pusher and subsequently introduced cars at intervals of about 24 minutes while the temperaturre within the kiln tunnel was equalized and maintained at a gradient which advanced uniformly and progressively from the entrance temperature of approximately 1400° F. up to approximately 2400° F. by means of appropriate settings and/or adjustments of the primary and auxiliary or make-up burners and the recirculating means. Each car traveled at a rate firing conditions of 2400° F. were reached in approximately 6 hours and continued therethrough for a firing dwell period of approximately 3.5 hours, followed by cooling. When ejected from the exit end of the tunnel kiln and cooled, each fired slab was passed through slitter saws and ground to 5 brick measuring 9 in. x 4½ in. x 2½ in.

These brick designed for 2300° F. temperature limit applications exhibited the following approximate average characteristics:

| | |
| --- | --- |
| Approximate density, lbs./cu. ft. | 31 |
| Traverse strength, lbs./sq. in. | 125 |
| Cold crushing strength, lbs./sq. in. | 210 |
| Linear shrinkage, percent at 2300° F. | 0.1 |
| Conductivity (B.t.u. in./sq. ft. ° F./hr. at 1000° F. mean) | 1.20 |

It will be understood that the foregoing details are given for purposes of illustration and not restriction, and that variations within the spirit of this invention are to be included within the scope of the appended claims.

What I claim is:

1. The method of producing lightweight insulating firebrick products consisting essentially of the steps of:
    (a) preparing a blend containing clay, gypsum plaster, sawdust and water;
    (b) admixing the blend forming the same into a castable plastic mass and inciting hydration of the gypsum plaster;
    (c) casting the wetted plastic mass into shaped slabs sized to approximate multiples of the dimensions of the desired insulating products, and upon substantial hydration of the gypsum;

(d) drying and firing the wet shaped slabs by subjecting the same in an atmosphere consisting essentially of an oxidizing atmosphere to uninterrupted and uniformly progressing increased ambient temperature conditions culminating at firing temperature, the said drying and firing comprising exposing the shaped slabs while wet to ambient temperatures initially of at least approximately 1000° F. which increase uniformly at a substantially continuous rate to ambient firing temperatures of approximately 2350° F. to approximately 2500° F., over a period of about 2 to about 12 hours with said period of heating varying proportionately with the temperatures, and maintaining the said firing temperatures for a dwell period sufficient to attain firing conditions uniformly throughout the slabs; and (e) cutting and trimming the fired slabs into insulating products.

2. The method of producing lightweight insulating firebrick products consisting essentially of the steps of:

(a) preparing a dry blend of lightweight insulating firebrick constituents comprising clay, gypsum plaster and sawdust;

(b) admixing the dry blend with water forming the same into a flowable, castable plastic mass and inciting hydration of the gypsum plaster;

(c) casting the wetted plastic mass into shaped slabs sized to approximate multiples of the dimensions of the desired insulating products, and upon substantial hydration of the gypsum;

(d) drying and firing the wet shaped slabs by subjecting the same in an atmosphere consisting essentially of an oxidizing atmosphere to uninterrupted and uniformly progressing increased ambient temperature conditions culminating at firing temperatures, the said drying and firing comprising transporting the shaped slabs while wet into and through a tunnel kiln wherein the initial ambient temperatures at the tunnel charging end are maintained at at least approximately 1000° F. and the ambient temperatures thereafter increase uniformly and progressively until attaining firing temperatures of about 2350° F. to approximately 2500° F., the transportation of the shaped slabs through the tunnel being at a substantially uniform rate providing the attainment of the area of firing temperatures over a period of about 2 to about 12 hours with said period of heating varying proportionately with the temperatures and a dwell period at firing temperatures of approximately 2 to approximately 6 hours; and (e) cutting and trimming the fired slabs into insulating products.

3. The method of producing lightweight insulating firebrick products consisting essentially of the steps of:

(a) preparing a dry blend containing approximately 45 to 65% by weight of kaolin clay, approximately 15 to 30% by weight of gypsum plaster, approximately 5 to 30% by weight of sawdust, and 0 to approximately 25% by weight of grog;

(b) admixing the dry blend with approximately equal parts by weight of water forming the same into a flowable, castable plastic mass and inciting hydration of the gypsum plaster;

(c) casting the wetted plastic mass into shaped slabs sized to approximate multiples of the dimensions of the desired insulating products, and upon substantial hydration of the gypsum plaster;

(d) drying and firing the wet shaped slabs by subjecting the same in an atmosphere consisting essentially of an oxidizing atmosphere to uninterrupted and uniformly progressing increased ambient temperature conditions culminating at firing temperatures, drying and firing comprising transporting the shaped slabs through a tunnel kiln wherein the slabs while wet are introduced into an initial atmosphere maintained at ambient temperatures of at least approximately 1000° F. which temperature increase uniformly and progressively through the kiln until attaining firing temperatures of about 2350° F. to approximately 2500° F., the transportation of the shaped slabs through the tunnel being at substantially uniform rate providing the attainment of the area of firing temperatures over a period of about 5 to about 7 hours and a dwell period at firing temperatures of approximately 3 to approximately 4 hours; and (e) cutting and trimming the fired slabs into insulating products.

4. The method of producing lightweight insulating firebrick products consisting essentially of the steps of:

(a) preparing a dry blend containing approximately 55% by weight of kaolin clay, approximately 23% by weight of gypsum plaster, approximately 12% by weight of sawdust, approximately 10% by weight of grog;

(b) admixing the dry blend with approximately equal parts by weight of water forming the same into a flowable, castable plastic mass and inciting hydration of the gypsum plaster;

(c) casting the wetted plastic mass into shaped slabs sized to approximate multiples of the dimensions of the desired insulating products, and upon substantial hydration of the gypsum plaster;

(d) drying and firing the wet shaped slabs by subjecting the same in an atmosphere consisting essentially of an oxidizing atmosphere to uninterrupted and uniformly progressing increased ambient temperature conditions culminating at firing temperatures, the said drying and firing comprising transporting the shaped slabs while wet into and through a tunnel kiln wherein the initial ambient temperature at the tunnel charging end is maintained at approximately 1400° F. and the ambient temperature thereafter increases uniformly and progressively until attaining firing temperatures of approximately 2400° F., the transporting of the shaped slabs through the tunnel being at a substantially uniform rate providing the attainment of the area of firing temperatures over a period of about 6 hours and a dwell period at firing temperatures of approximately 3.5 hours; and (e) cutting and trimming the fired slabs into insulating products.

5. The method of claim 4 wherein the cast shaped slabs measure approximately 25 in. x 10 in. x 3 in. and upon firing are divided into five standard bricks.

References Cited by the Examiner

UNITED STATES PATENTS 2,242,434   5/1941   Norton _____ 264—63

ROBERT F. WHITE, *Primary Examiner.*

R. B. MOFFITT, *Assistant Examiner.*